United States Patent
Iwane

Patent Number: 5,839,003
Date of Patent: Nov. 17, 1998

[54] FOCUS ADJUSTMENT METHOD AND APPARATUS

[75] Inventor: Touru Iwane, Yokohama, Japan

[73] Assignee: Nikon Corporation, Tokyo, Japan

[21] Appl. No.: 871,760

[22] Filed: Jun. 9, 1997

Related U.S. Application Data

[60] Provisional application No. 60/038,204 Feb. 18, 1997.

[30] Foreign Application Priority Data

Jun. 26, 1996 [JP] Japan ..................................... 8-165981

[51] Int. Cl.$^6$ .................................................. G03B 13/36
[52] U.S. Cl. ............................................................ 396/102
[58] Field of Search ...................................... 396/102, 104

[56] References Cited

U.S. PATENT DOCUMENTS 4,575,212  3/1986  Kitaura et al. .......................... 396/102

Primary Examiner—W. B. Perkey
Attorney, Agent, or Firm—Oliff & Berridge, PLC

[57] ABSTRACT

A focus adjustment method and apparatus use statistical methods to discriminate whether an out-of-focus condition is the result of minor fluctuation or is the result of a significant change in object image condition (distance, etc.) requiring a focus adjustment. This results in good hunting suppression without sacrificing good focus adjustment performance, and flexibly adapts to different object conditions. The focus adjustment method and apparatus drive the optical system to an in-focus state based on detected focus information, and perform statistical analysis of successive focus information inputs to compute a variance value. Driving of the optical system to correct focus recommences when the defocus amount exceeds a predetermined threshold value based on the variance value.

16 Claims, 12 Drawing Sheets

FOCUS ADJUSTMENT METHOD AND APPARATUS

This non-provisional application claims benefit of U.S. Provisional Application No. 60-038,204 filed Feb. 18, 1997, entitled "AUTOFOCUSING DEVICE", by Touru IWANE (Attorney Docket No. JAO 32389).

BACKGROUND OF THE INVENTION

1. Field of Invention

This invention relates to automatic focus adjustment of an optical system, and more particularly to a focus adjustment method and apparatus that determine the defocus threshold value for refocusing based on fluctuations in focus information obtained by the optical system.

2. Description of Related Art

Conventionally, focus adjustment apparatus have been provided in optical equipment such as cameras or the like in order to automatically adjust the focus of an optical system. These focus adjustment apparatus use various focus detection methods (e.g., the phase difference detection method or the external light passive method) to successively detect focus information such as the defocus amount or the range value.

The focus adjustment apparatus successively updates the target driving position of the optical system on the basis of this defocus amount or other data, and controls driving of the optical system until this target driving position is reached. Ideally, when the optical system has reached the target driving position, the defocus amount becomes zero and the optical system is stopped at this target driving position.

However, in actuality the detected value of the defocus amount does not become zero and slight fluctuations occur even when the optical system reaches the target driving position because of noise or the like created in the CCD used for focus detection. Consequently, the target driving position is updated little by little, and minute fluctuation (hunting) occurs in the optical system.

This hunting phenomenon causes wavering or straying of the focus adjustment as observed by the photographer, hence suppression of this is strongly desired. Therefore, with this kind of focus adjustment apparatus, a focusing width 50 is arbitrarily set beforehand, as shown in FIG. 12a.

This arbitrary setting determines an "in-focus state" when a value of the defocus amount becomes less than (for example) 100 $\mu$m. The focus adjustment apparatus halts updating of the target driving position upon making the in-focus state determination.

Accordingly, if the defocus amount fluctuates within the range of the focusing width, the target driving position is not updated and the optical system focus state remains constant. In this way, fluctuations of the defocus amount are restricted to within the focusing width, and hunting is minimized in the optical system.

On the other hand, when the defocus amount exceeds the focusing width, the focus adjustment apparatus determines that an unfocused state is reached based on the arbitrary setting. When in the unfocused state, the focus adjustment apparatus restarts updating of the target driving position, and drives the optical system toward the new target driving position.

FIG. 12b shows a conventional system that provides hysteresis in the focusing width. With this kind of setting, the focusing range 52 widens by a hysteresis allowance 54 when the defocusing amount enters the range of the focusing width 50. Consequently, fluctuations caused by the defocus amount momentarily exceeding the range of the focusing width are reduced, so that hunting is considerably reduced.

Normally, for an object having low brightness or low contrast, the focus detection accuracy drops and a great deal of fluctuation of the focus information (defocus amount or range value) occurs. However, in the conventional examples shown in FIG. 12a and FIG. 12b, the focusing width or the hysteresis allowance 54 is arbitrarily set regardless of the type of object. Consequently, when focus adjustment is performed for an object with extremely low contrast or low brightness, fluctuations of the focus information in excess of the hysteresis allowance 54 occur, causing additional hunting.

This hunting can be reduced by making the focusing width 50 or hysteresis allowance 54 extremely wide. However, the increase in the focus width 50 or the hysteresis allowance 54 causes a delay in making necessary changes in focus. When an object or its distance changes, restarting driving of the optical system to correct the focus is delayed by the amount of widening of the focusing width 50 or hysteresis allowance 54. As a result, focus adjustment responsiveness is severely impaired, and valuable photographic opportunities may be missed due to the unresponsiveness of the focus adjustment apparatus.

Furthermore, for objects in which the focus is off slightly, the focusing width 50 or hysteresis allowance 54 is not exceeded and the focus information does not change, so that necessary re-focusing of the optical system is not accomplished. As a result, even if the photographer notices that an object is slightly out of focus, the focus adjustment apparatus will not detect this, making it impossible to perform minute or fine focus adjustment.

SUMMARY OF THE INVENTION

As noted above, it is extremely difficult to accomplish both hunting suppression and focus adjustment performance for many objects. It is possible to use a method wherein the focusing width or hysteresis allowance is successively changed in accordance with the contrast amount and the brightness of the object. However, fluctuations of the focus information can change unpredictably because of the image patterns in many object images. Hence, even with this method, it is impossible to judge fluctuations of the focus information accurately, resulting in insufficient changing of the focusing width or hysteresis allowance in an appropriate and flexible manner.

It would therefore be useful to provide:

1) a focus adjustment apparatus that can accurately accomplish both hunting suppression and focus adjustment performance, and is flexibly adapted to changes in numerous object conditions;

2) a focus adjustment apparatus that can, in addition, more swiftly and accurately accomplish both hunting suppression and focus adjustment performance; and 3) a focus adjustment apparatus that can promptly change the threshold value for restarting driving of the optical system in response to rapid changes in the object condition.

Accordingly, a method and corresponding apparatus for an optical system is provided that will improve operation of an automatic focusing system for a camera or other optical system. With the invention, 1) focus information is detected; 2) a defocus amount is determined based on the focus information; 3) a target driving position is determined; and 4) the optical system is driven to an infocus state based on the target driving position.

Once the optical system is in focus, focus information continues to be detected multiple times. These information are subjected to statistical analysis; a central value based on the focus information is determined; and a statistical variance value based on the focus information and the central value is determined. Once the variance value is determined, a threshold value is set based on the variance value. Focus information continues to be detected, and when the defocus amount exceeds the determined threshold value, the optical system is once again driven to an updated target driving position so that the optical system is once more in focus.

Optionally, the threshold value may be determined and/or modified based on confidence information relating to reliability of the focus information, such as: 1) brightness of the object image; 2) spatial frequency distribution of the object image; 3) contrast of the object image; 4) movement speed of an object corresponding to the object image; 5) slope of a correlation curve when correlation computations are performed on a group of optical images created by partitioning an imaging object image light rays; or 6) some other useful variable relating to reliability of the focus information.

The central value used in determining the statistical variance value can be the average value of the multiple focus information obtained, the trend center of the focus information, or some other value. In this way, the invention achieves a good balance between high responsiveness to changes in focus due to changes in object image distance, and reduction of undesirable focus system movement such as hunting caused by minor fluctuations.

BRIEF DESCRIPTION OF THE DRAWING

The invention will be described in relation with the following figures of the drawing, wherein like numerals represent like elements, and wherein.

DETAILED DESCRIPTION OF PREFERRED EMBODIMENTS

Figure 1:
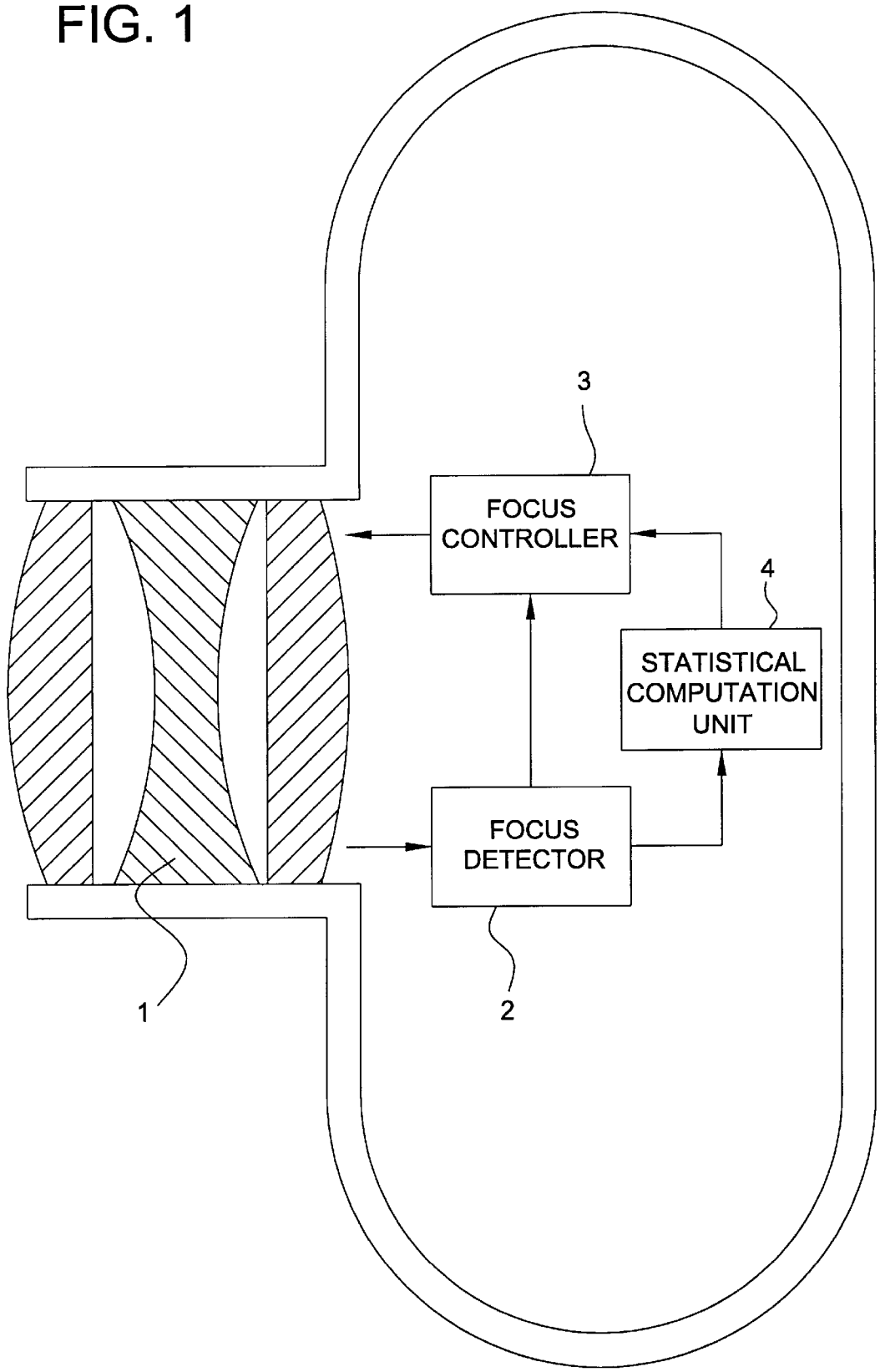
FIG. 1 is a block diagram of a first embodiment according to the invention.

FIG. 1 shows a first embodiment of the invention. Focus detector 2 detects focus information of the optical system 1. Focus controller 3 drives the optical system 1 to an in-focus state on the basis of the focus information detected by the focus detector 2. Statistical computation unit 4 performs statistical analysis of the focus information at multiple times and computes a variance value based on from the focus information. The focus controller 3 restarts driving of the optical system 1 when the focus information exceeds a threshold value. The threshold value is generated based on the variance value when the focus controller is either not driving the optical system 1, or not updating the target driving position.

Figure 4:
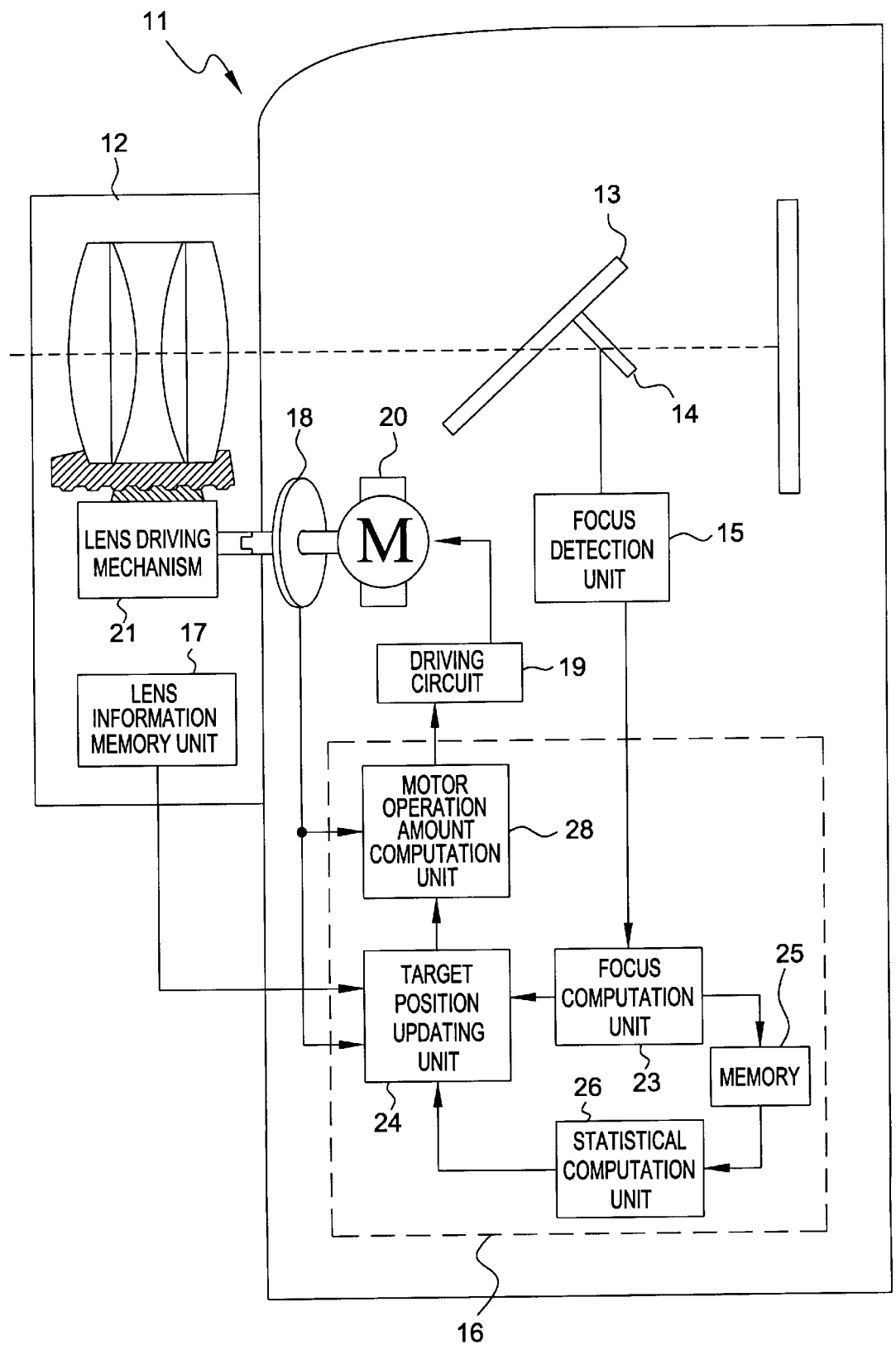
FIG. 4 illustrates a first variation of the first embodiment.
Figure 5:
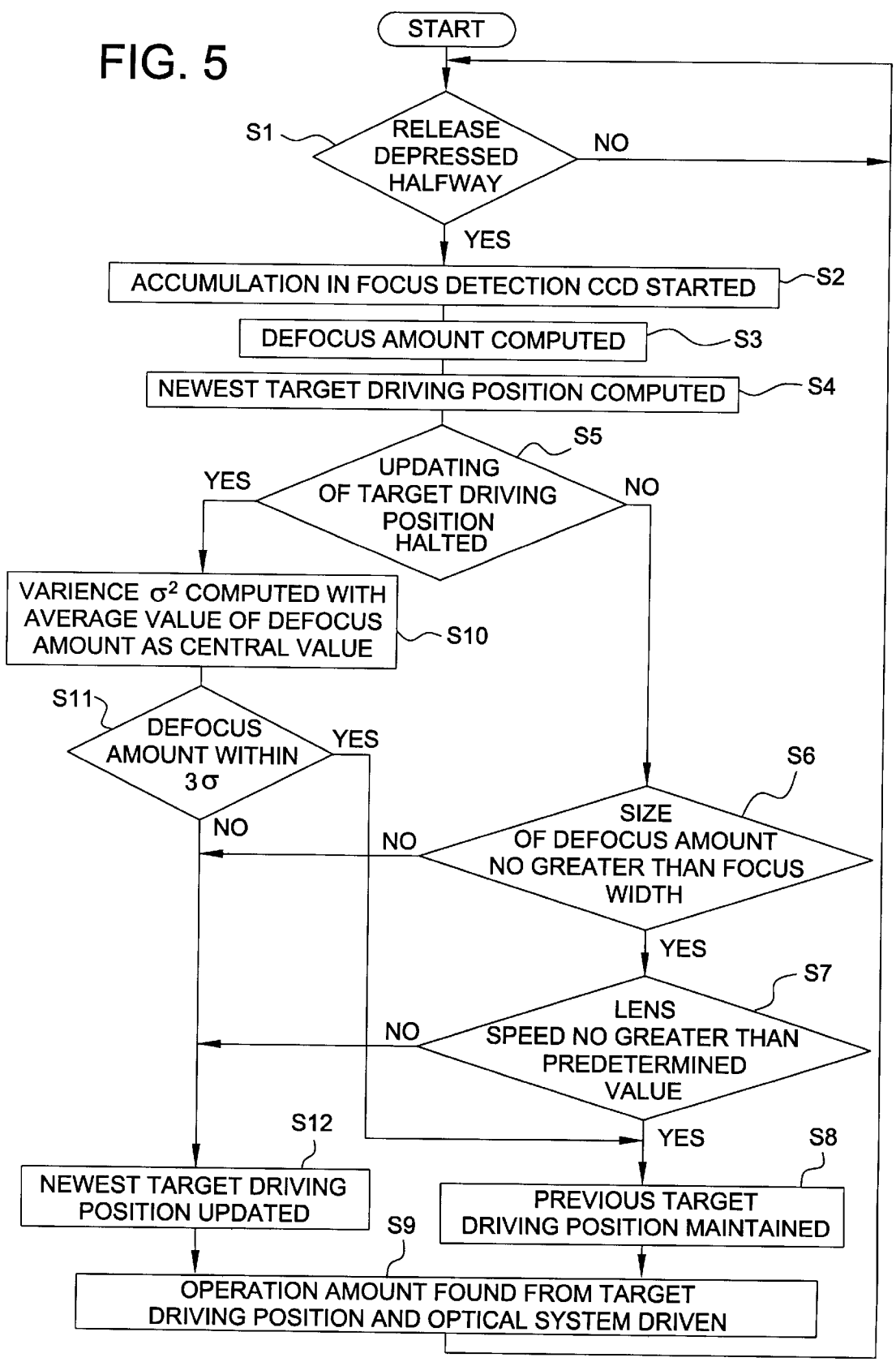
FIG. 5 is a flowchart of the operation of the first variation of the first embodiment.
Figure 6A:
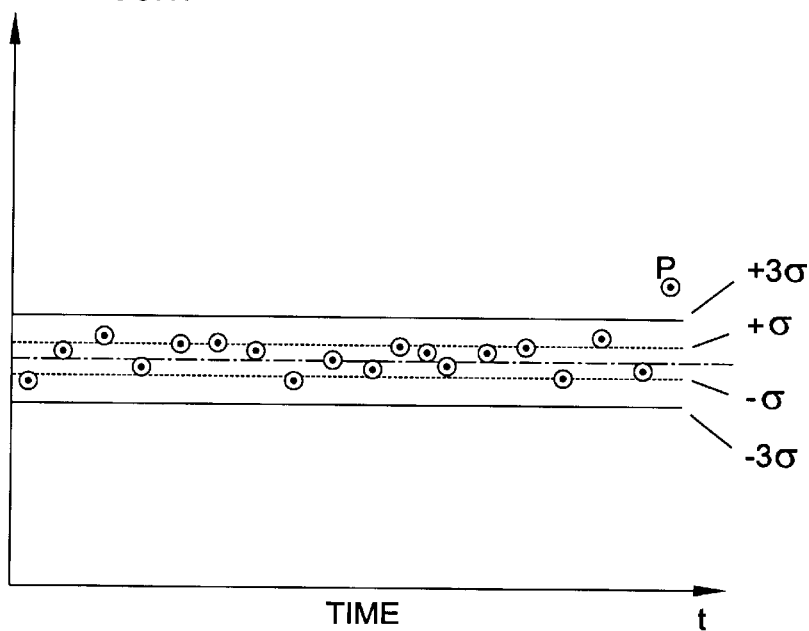
FIG. 6a illustrates the defocus amount in the first variation of the first embodiment where fluctuation in the defocus amount is small.
Figure 7:
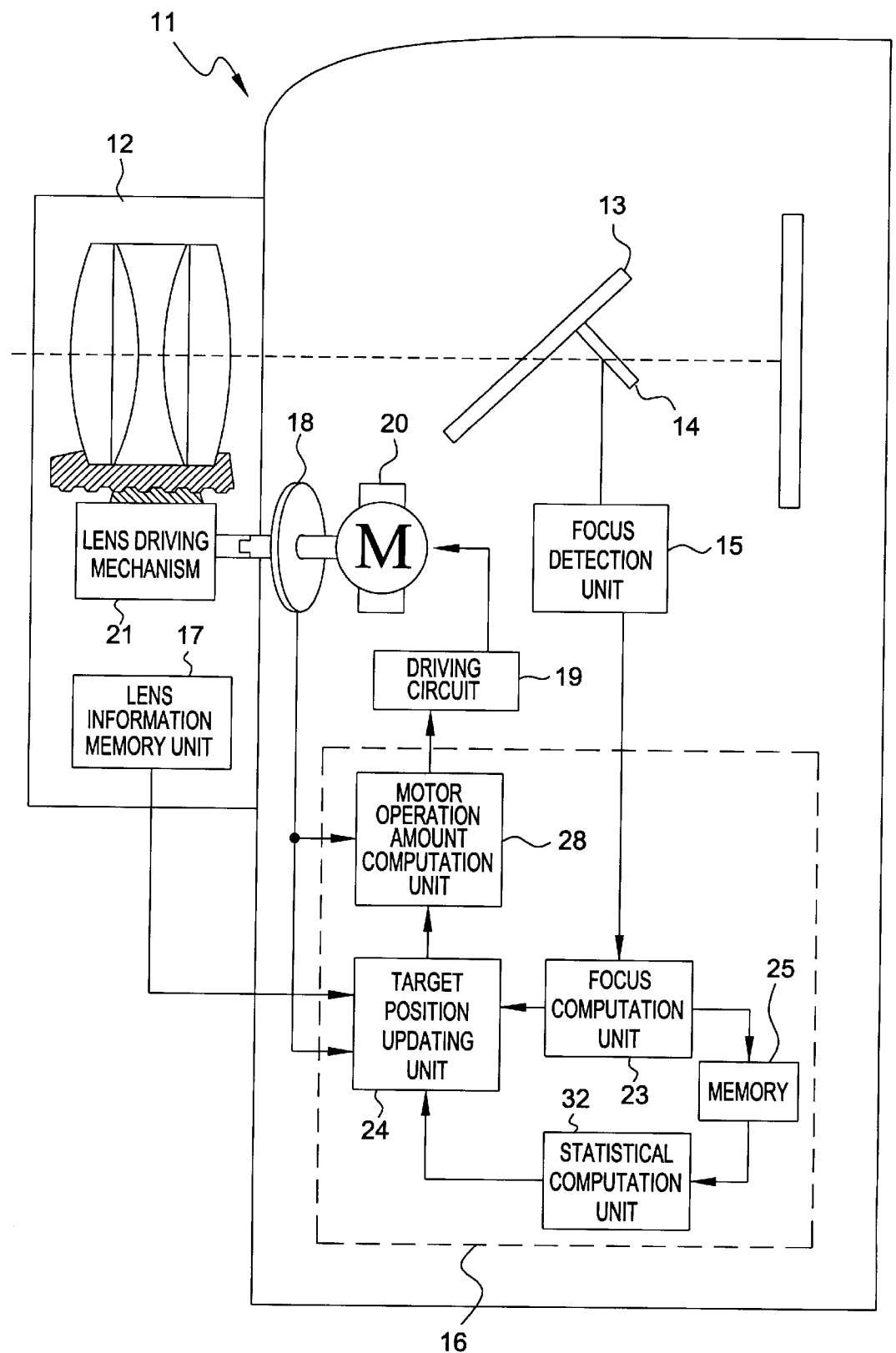
FIG. 7 illustrates a second variation of the first embodiment.
Figure 8:
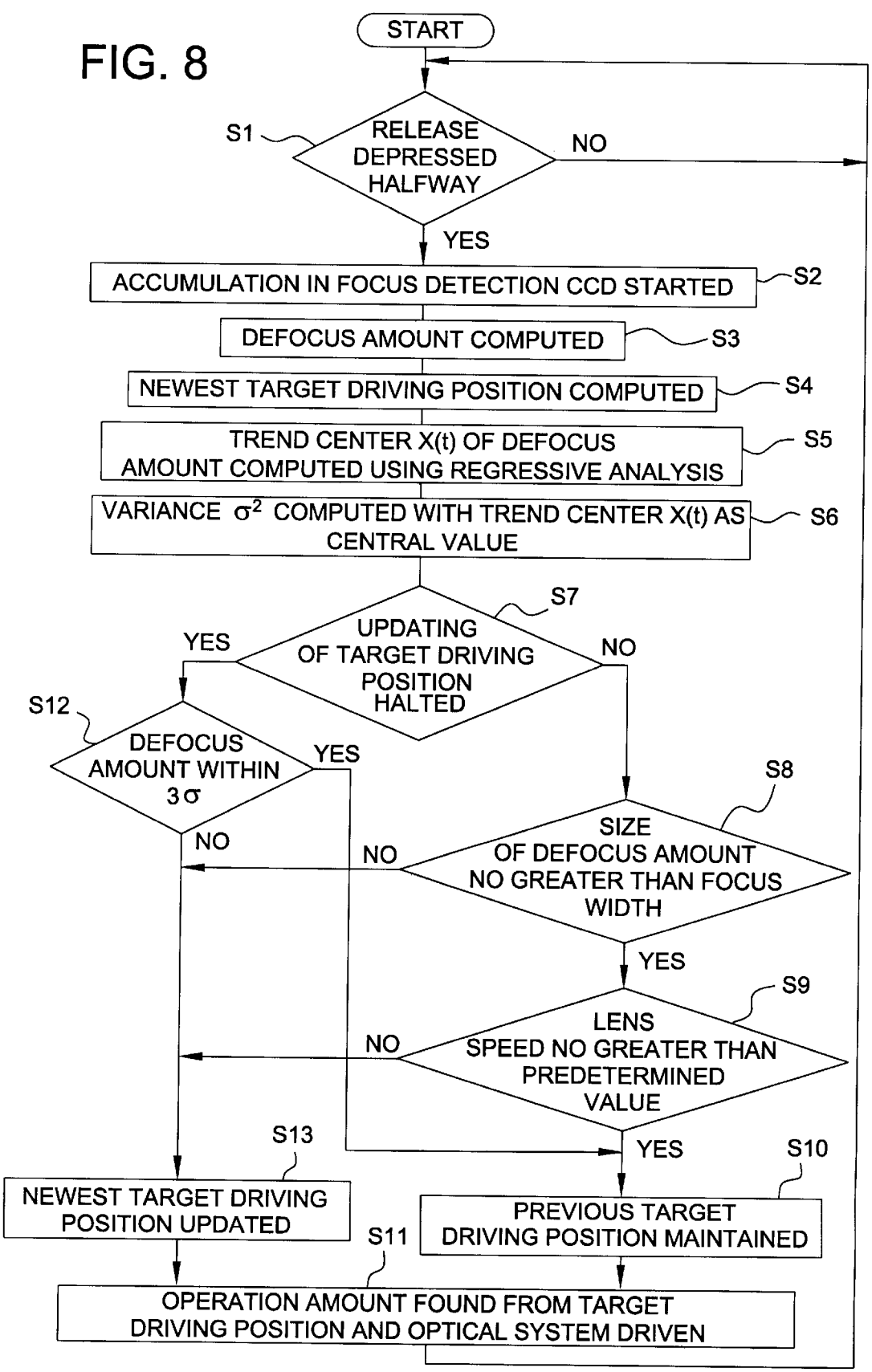
FIG. 8 is a flowchart of the operation of the second variation of the first embodiment.

FIGS. 4–6 show the first embodiment, where the statistical computation unit 4 computes the variance value of the focus information using an average value of the focus information as the central value. Alternatively, FIGS. 7–9 show a second variation of the first embodiment, where the statistical computation unit 4 computes the variance value of the focus information using a trend center of the focus information as the central value. Other embodiments may use other statistical methods of obtaining a variance value.

Figure 2:
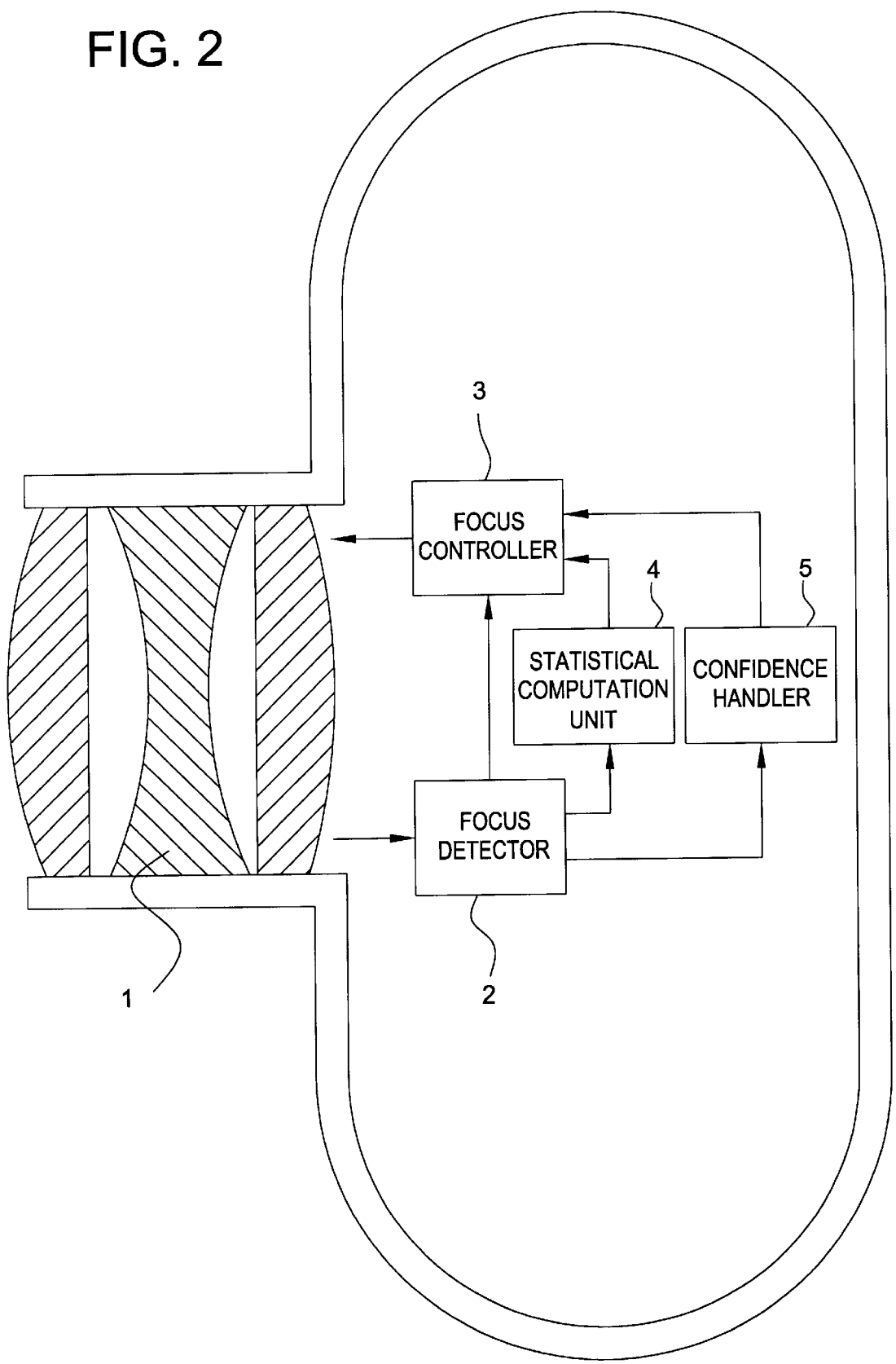
FIG. 2 is a block diagram of a second embodiment according to the invention.
Figure 10:
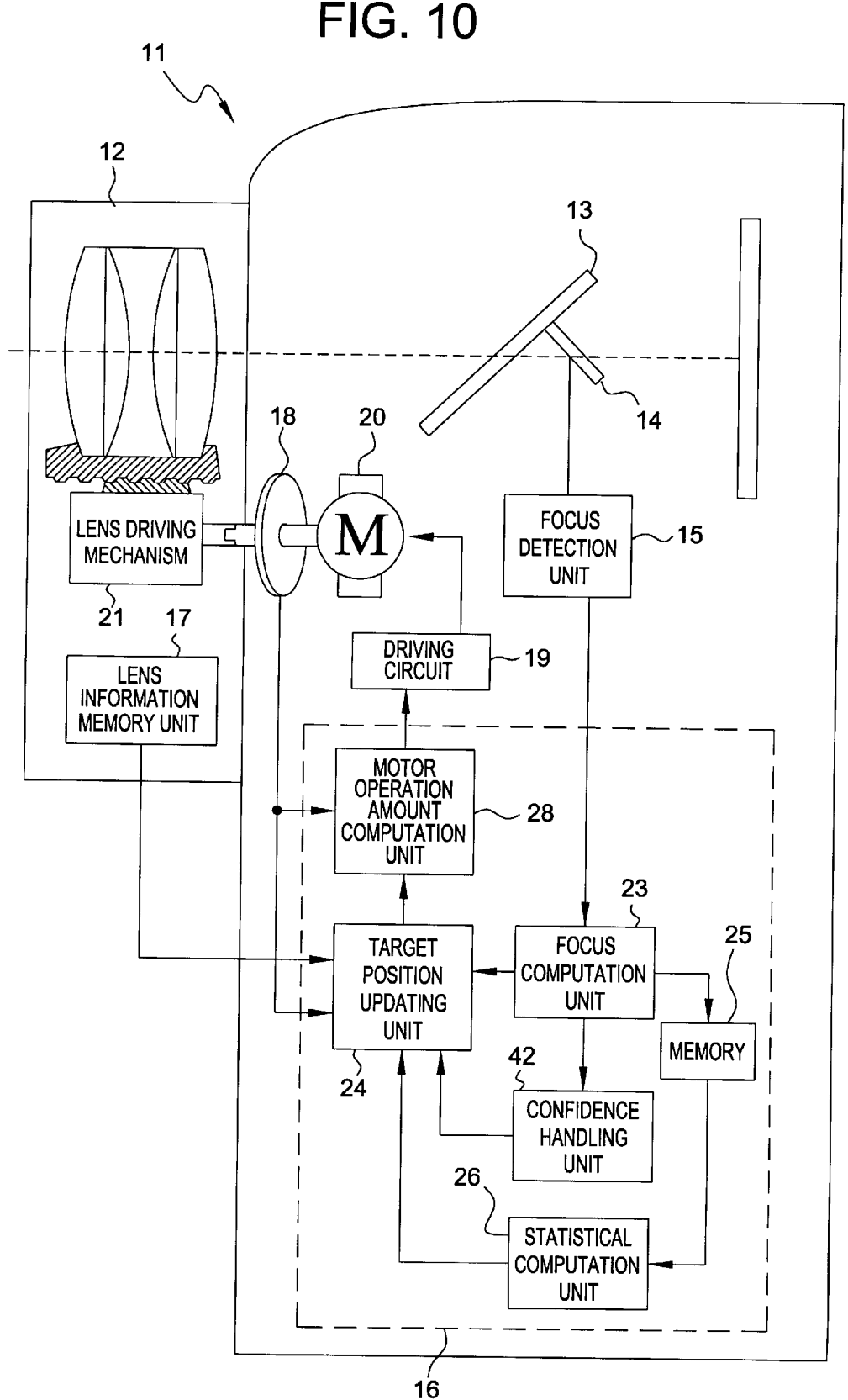
FIG. 10 illustrates a second embodiment according to the invention.
Figure 11:
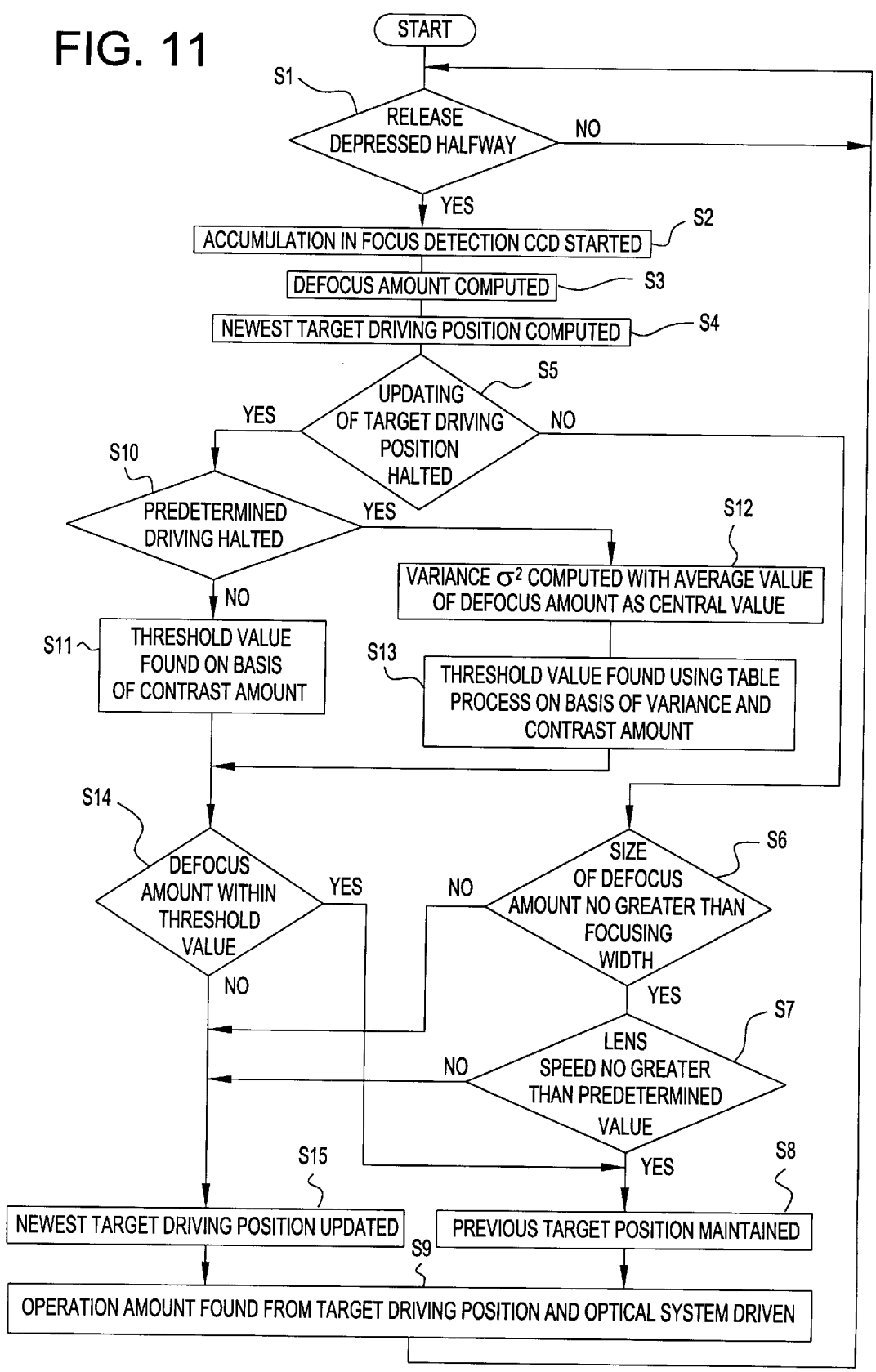
FIG. 11 is a flowchart of the operation of the second embodiment.
Figure 12A:
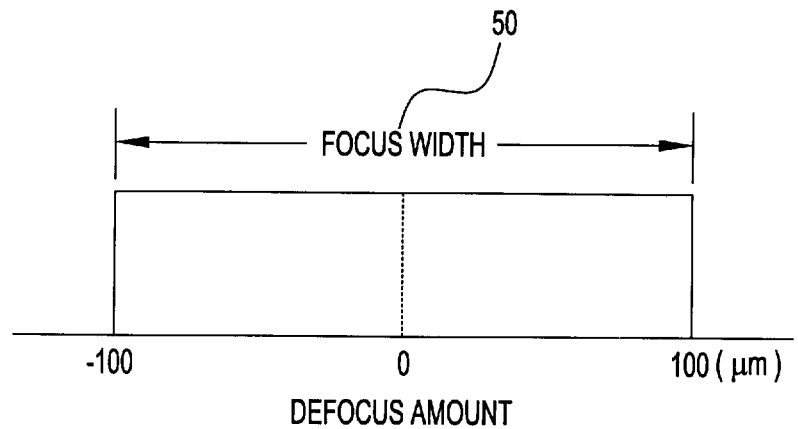
FIG. 12a shows a possible focusing width used in focusing apparatus.
Figure 12B:
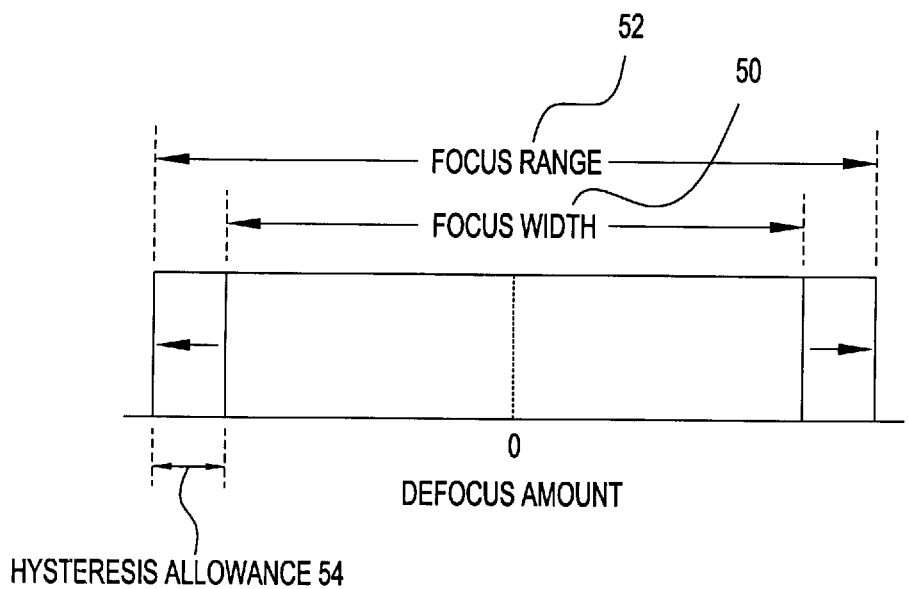
FIG. 12b illustrates how a hysteresis allowance may be used.

FIGS. 2, 10, and 11 show a second embodiment of the invention, where a confidence handler 5 is added. The confidence handler 5 selects or revises the threshold value in accordance with confidence information based on how reliable the focus information is likely to be. In this embodiment, the confidence information is based on the brightness of the object image, or the spatial frequency distribution of the object image, or the contrast of the object image, or the movement speed of the object, or the steepness (slope) of the correlation curve when correlation computations are performed on the group of optical images created by partitioning and imaging the object light rays.

In all the above embodiments: 1) the defocus amount, range value, and other focus information are detected by the focus detector 2; 2) the focus controller 3 drives the optical system 1 to the in-focus state on the basis of this focus information; and 3) the statistical computation unit 4 detects a variance value of the focus information that indicates the fluctuation state of the focus information. The variance value is detected by performing statistical analysis of the focus information at different times. The focus controller 3 determines the threshold value based on the variance value of the focus information.

In general, at the stage where it is determined that the optical system 1 has reached the in-focus state, the focus controller 3 halts driving of the optical system 1 or halts updating of the target driving position. In this halted state, the focus controller 3 determines whether or not the focus information exceeds the threshold value, and, when this is exceeded, restarts driving of the optical system 1.

Unlike the object brightness and contrast amount, which are only two factors causing fluctuations of the focus information, the variance value directly represents the fluctuation state of the focus information, and consequently it is possible to more accurately find the best hunting occurrence allowance for the current object image condition. One reason for this is that the probability density distribution (for example a normal distribution) indicating the fluctuation state of the focus information is clarified before determining the threshold value. Because of this, it is possible to statistically determine, from the computed variance value, the probable focusing range that will encompass fluctuations of the focus information.

In correlation with this range, determination of whether the change of the focus information is caused by fluctuations or is a significant change can be accomplished with more certainty. The threshold value for restarting driving is thereby determined, in order to more accurately determine whether or not to restart driving.

For example, when the probability density distribution of the focus information is a normal distribution, the probability that the fluctuations of the focus information are at a position outside the below threshold values are as follows:

| Threshold value | Probability of fluctuation outside threshold value |
|---|---|
| ±σ | 31.74% |
| ±2σ | 4.55% |
| ±3σ | 0.27% |
| ±4σ | 0.006% | where the variance value=$\sigma^2$.

Accordingly, when focus information outside the threshold value is detected with a frequency exceeding the above fluctuation probabilities, and when focus information outside the threshold value is detected although the fluctuation probability is sufficiently small, it is possible to accurately determine that the change of the focus information is not caused by fluctuations, but is a significant change. It is thus possible to restart driving when appropriate.

Consequently, unlike conventional focusing methods, the drop in performance in focus adjustment can now be reduced to a minimum because it is not necessary to raise the threshold value excessively in anticipation of various changes in the object condition. In this way, by determining the threshold value to restart driving on the basis of the variance value, it is possible to accurately determine the best hunting allowance for the current object condition by probabilistic substantiation, and to find an appropriate minimized undesired hunting while maximizing focus adjustment performance.

As mentioned before, the statistical computation unit 4 can compute the variance value of the focus information with the average value of the focus information as the central value. Normally, the optical system 1 is near the target driving position immediately prior to the determination of the in-focus state, and consequently the movement speed of the optical system is sufficiently reduced.

In this kind of situation, the change in focus information created by movement of the optical system 1 is small, and it is possible to consider the average value of the focus information as the fluctuation center. Accordingly, in cases where the sampling interval is designated immediately prior to the determination of the in-focus state, it is possible to detect simply and accurately the fluctuation state of the focus information by computing the variance value with the average value of the focus information as the central value.

In addition, after the in-focus state has been determined, driving of the optical system 1 and updating of the target driving position are halted, and consequently the movement speed is further reduced. Accordingly, even in cases where the sampling interval is designated from immediately prior to the determination through after the determination, it is possible to detect simply and accurately the fluctuation state of the focus information by computing the variance value with the average value of the focus information as the central value.

In general, the computation process that finds the average value has markedly less computation processing and is capable of faster processing than computation processes (moving average or regressive analysis or the like) that find the movement center. When the sampling interval of the focus information is set to be long, the number of samples increases, so the precision of the variance value rises. On the other hand, the lengthening of the sampling interval causes the movement of the fluctuation center to be greatly increased, so that the variance value is computed to be larger than the value indicating the fluctuation state of the focus information.

To address this case, the computed variance value can be reduced in anticipation of the movement of the fluctuation center. In addition, when the sampling interval is set beforehand, it is possible to set the optimum sampling interval through weighted evaluation of the precision of the variance value and of the movement of the fluctuation center.

The statistical computation unit 4 can also compute the variance value of the focus information using the trend center as the central value. The statistical computation unit 4 finds the trend center of the focus information using, for example, a statistical computation such as moving average, regressive analysis, or the like.

By using the trend center as the central value, the effects of the movement of the fluctuation center included in the computed variance value are actually excluded, and the variance value can be more accurately computed. Accordingly, even if the sampling interval of the focus information is set to be long, the correlation between the variance value and the fluctuation state of the focus information is well maintained. Consequently it is possible to determine the fluctuation state of the focus information more accurately. In addition, it is possible to pre-compute the variance value prior to the determination of the in-focus state, and thus quickly start threshold value determination for restarting driving immediately after the determination of the in-focus state.

The confidence handler 5 selects or revises the threshold value for restarting driving of the optical system 1 in accordance with confidence information relating to the confidence of the focus information. Accordingly, the threshold value for restarting driving of the optical system 1 is set on the basis of a plurality of values such as the variance value of the focus information, the confidence information for the focus information, and the like.

The variance value of the focus information is a value that directly indicates the fluctuation state of the focus information, and can be used to set the threshold value for restarting driving of the optical system 1 more accurately. However, several inputs of changed focus information are necessary in order for the variance value to change. Consequently in cases where the object condition changes rapidly, change in the threshold value is somewhat delayed.

On the other hand, the object brightness, contrast amount, and other confidence information cannot by themselves be used to set the threshold value accurately, because these are not the only factors causing fluctuation of the focus information. However, these confidence information items are values that change in response to rapid changes in the condition of the object image. Accordingly, by revising the threshold value for restarting driving of the optical system 1 in accordance with these confidence information, it is possible to change the threshold value promptly in response to rapid changes in the object condition.

As described above, the threshold value modifications caused by the confidence information are temporary modifications, and hence it is fine for the changed threshold value to return to its original value with the passage of time. Through this kind of structure, it is possible to move smoothly to a more accurate threshold value setting on the basis of the variance value of the focus information with the passage of time.

In addition, when a large discrepancy occurs between the variance value predicted from the confidence information and the actual variance value, the cause of the fluctuation of the focus information is not in the measurement system but can be recognized to be on the object side. For example, an object combining close end far (an object having close and far photographic objects coexisting in adjacent areas) or periodic objects (objects for which a ragged property is created in the correlation curve of the phase difference detection and for which false defocus amounts are erroneously detected because periodicity is present in the image pattern) can be recognized.

Accordingly, when the correlation between the confidence information and the variance value drops dramatically, it is possible to detect that the object includes both objects that are close and objects that are far, or the like. It is also possible to appropriately modify the pattern of focus adjustment and the photographic mode of the camera in conformity with the classification detection of this kind of object.

Any one or more of the below-described values may be utilized as confidence information relating to the confidence of the focus information:

(1) Brightness of the Object Image

When the brightness of the object image is low, the signal-to-noise (S/N) of the light-receiving device used in focus detection becomes low, causing the fluctuations of the focus information to become larger. This brightness can be detected, for example, through the photometric value of the peripheral light quantity, the photometric value of the object, the accumulation time of the light-receiving device used in focus detection, or the like.

(2) Spatial Frequency Distribution of the Object Image

When the spatial frequency distribution is distributed centered on the low region, the detection precision for phase difference in the space becomes lower because, for example, the residual of the image pattern does not greatly change in the correlation computation of the phase difference detection method. As a result, fluctuations of the focus information become larger. This kind of spatial frequency distribution can be detected, for example, from the output level of a transversal filter or other spatial filters.

(3) Contrast in the Object Image

When the contrast in the object image is low, the high range and large amplitude frequency components are not included in the image pattern, and consequently the residual of the image pattern does not greatly change. As a result, the detection accuracy of the phase difference in the space becomes lower, and fluctuations of the focus information become larger.

(4) Movement Speed of the Object

When the movement speed of the object image is large, the exposure flow of the object image becomes larger, and the high range spatial frequency components included in the image pattern are lost. Consequently, the residual of the image pattern does not greatly change and the detection precision of the phase difference in the space becomes lower. As a result, fluctuations of the focus information become larger.

(5) Slope of the Correlation Curve

Figure 3:
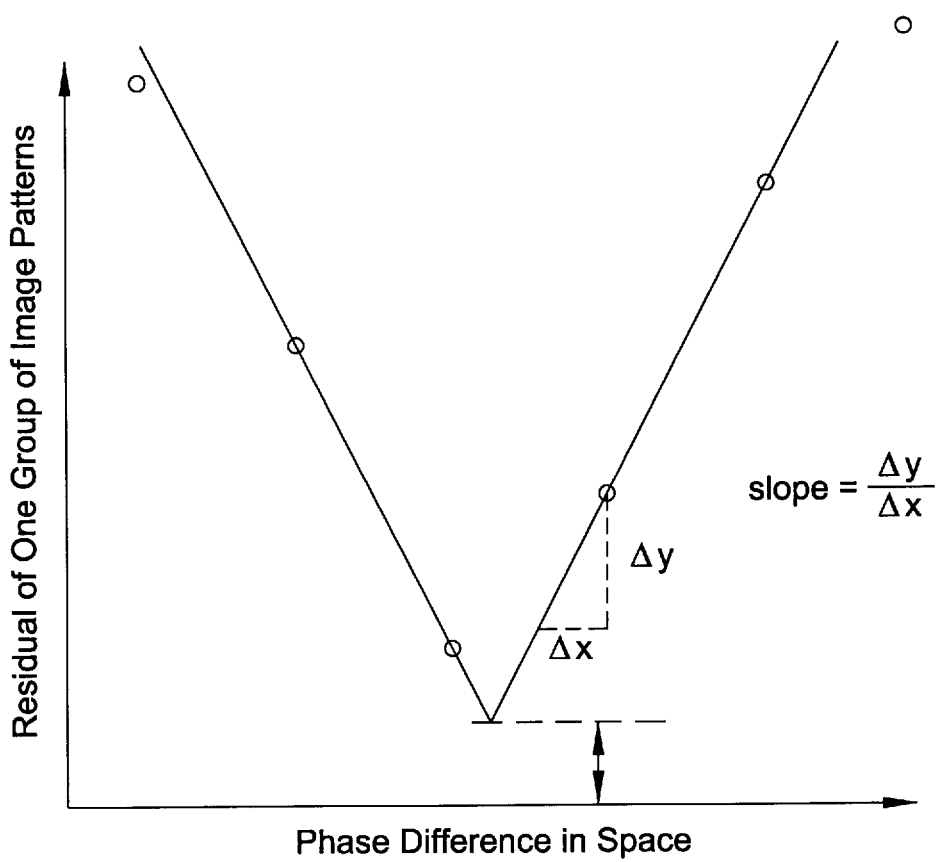
FIG. 3 shows the correlation curve between the residual of one group of image patterns (vertical axis), and the phase difference in the space correlation curve (horizontal axis), and indicating the slope of the curve and the minimum correlation value.

When the slope or steepness of the correlation curve (shown in FIG. 3) is low, the detection accuracy of the phase difference in the space becomes lower, and fluctuations of the focus information become larger.

(6) Minimum Correlation Amount in the Correlation Curve

When the minimum correlation amount (shown in FIG. 3) is large, the correlativity of the image pattern is the low case for the group of optical images partitioned and composed into images. In this case, the detection accuracy of the phase difference in the space becomes lower, and fluctuations of the focus information become larger.

By finding the confidence information of any of (1) through (6) above, it is possible to easily estimate the fluctuation state of the focus information accompanying rapid change in the object condition. Accordingly, it is possible to quickly modify the threshold value for restarting driving without being slower than the rapid change in the object condition.

In FIG. 4, an optical system 12 is mounted on a camera 11. A quick return mirror 13 and an auxiliary mirror 14 are positioned in order along the optical axis of the optical system 12. A focus detection unit 15 is positioned in the direction of reflection from the auxiliary mirror 14 and connected to a microprocessor 16.

A lens information memory unit 17 and an encoder 18 positioned on the driving axis of a motor 20 are also connected to the microprocessor 16. The microprocessor 16 is connected to a motor 20 via a driving circuit 19. The motor 20 drives a lens driving mechanism 21 in the optical system 12.

The internal functions of the microprocessor 16 are shown in block diagram format. An output of the focus detection unit 15 is supplied to a focus computation unit 23, and the computation results from the focus computation unit 23 are supplied to a target position updating unit 24 and a memory 25. The output of the memory 25 is supplied to a statistical computation unit 26.

The computation results from the statistical computation unit 26 are supplied to the target position updating unit 24, and updating results from the target position updating unit are supplied to a motor operation amount computation unit 28. A pulse width modulation (PWM) output of the motor operation amount computation unit 28 is supplied to the motor 20 via the driving circuit 19.

In addition, lens information of the lens information memory unit 17 is supplied to the target position updating unit 24. The pulse output of the encoder 18 is supplied to the target position updating unit 24 and the motor operation amount computation unit 28.

FIG. 5 is a flowchart showing a process of the operation of a first variation of the first embodiment, in which the variance value is computed using the average of the focus information as the central value. First, when the release switch (not shown) of the camera 11 is depressed halfway (S1 in FIG. 5), an accumulation of photoelectric charge begins in the focus detection unit 15 (S2 in FIG. 5). The focus computation unit 23 receives the photoelectric output from the focus detection unit 15, and computes the defocus amount through a commonly known phase difference detection computation (S3 in FIG. 5).

The target position updating unit 24 computes the target driving position that the optical system 12 is to reach on the basis of the defocus amount and the lens position found from the encoder 18 (S4 in FIG. 5). Then, if updating of the target driving position has been accomplished the previous time, i.e., has not been halted (S5 in FIG. 5), determinations are made as to whether or not the value of the defocus amount is no greater than a predetermined focusing width (S6 in FIG. 5) and whether or not the lens speed is no greater than a predetermined value (S7 in FIG. 5).

If the results of these determinations are affirmative, the target position updating unit 24 determines that an in-focus state has been reached, and updating of the target driving position is halted (S8 in FIG. 5). In this case, the motor operation amount computation unit 28 drives the motor 20 on the basis of the positional difference between the target driving position at which updating is halted and the current lens position, and the optical system 12 is driven to this target driving position and is then halted (S9 in FIG. 5).

If, however, the determination (S6, S7) results are negative, the determination is that of an unfocused state, and the target driving position is updated to the newest value (S12 in FIG. 5). In this case, the motor operation amount computation unit 28 drives the motor 20 on the basis of the positional difference between the newest target driving position and the current lens position, and the optical system 12 is driven toward the newest target driving position (S9 in FIG. 5).

On the other hand, if updating of the target driving position has not been accomplished the previous time, i.e., has been halted (S5 in FIG. 5), a determination is made through the below-described sequence as to whether the newest change in the defocus amount is caused by fluctuations or is caused by a significant change. First, the statistical computation unit 26 receives the last N defocus amounts bf, and computes the average value $bf_{avg}$ of the previous N defocus amounts using:

$$bf_{avg} = \frac{1}{N} \sum_{i}^{N} bf_i \quad (1)$$

The difference from each of the defocus amounts bf is found using this average value $bf_{avg}$ as a central value. By finding the mean of the square of the differences, the variance value $\sigma^2$ of the defocus amount is determined (S10 in FIG. 5) from the equation:

$$\sigma^2 = \frac{1}{N} \sum_{i}^{N} (bf_i - bf_{avg})^2 \quad (2)$$

The target position updating unit 24 determines the threshold value for restarting driving as $3\sigma$ (three times the standard deviation $\sigma$) on the basis of these computation results.

Next, the target position updating unit 24 determines whether or not the value of the newest defocus amount falls within $3\sigma$ (S1 in FIG. 5). When the fluctuations in the defocus amount are a normal distribution, the probability of the defocus amount fluctuating in excess of this $3\sigma$ is approximately 0.27%. Accordingly, when the defocus amount changes in excess of $3\sigma$ in spite of the fact that the probability is so low, it is apparent that this is not merely a change caused by fluctuations, but that a significant change has occurred at the object caused by movement of the object or the like, for example.

The target position updating unit 24 restarts updating of the target driving position on the basis of these determinations (S12 in FIG. 5). As a result, driving is restarted, and the optical system 12 is driven toward the new focus point.

Conversely, when the value of the newest defocus amount is within $3\sigma$, the target position updating unit 24 decides that the change is one caused by fluctuations in the defocus amount, and the previous target driving position is maintained without change (S8 in FIG. 5). As a result, driving of the optical system 12 is not restarted, and hunting caused by fluctuations in the defocus amount is prevented. Then, the process returns to step S1 and a next iteration of these operations is performed.

Through the operations described above, the threshold value for restarting driving is set appropriately in accordance with the variance value of the defocus amount. As shown in FIG. 6a, when the fluctuations in the defocus amount are small, the variance value $\sigma^2$ becomes small, and consequently the threshold value $3\sigma$ for restarting driving becomes small. Accordingly, this method is sensitive in detecting a significant change in the defocus amount (point P in FIG. 6) so that updating the target driving position and driving the optical system 12 to focus may be promptly restarted.

Figure 6B:
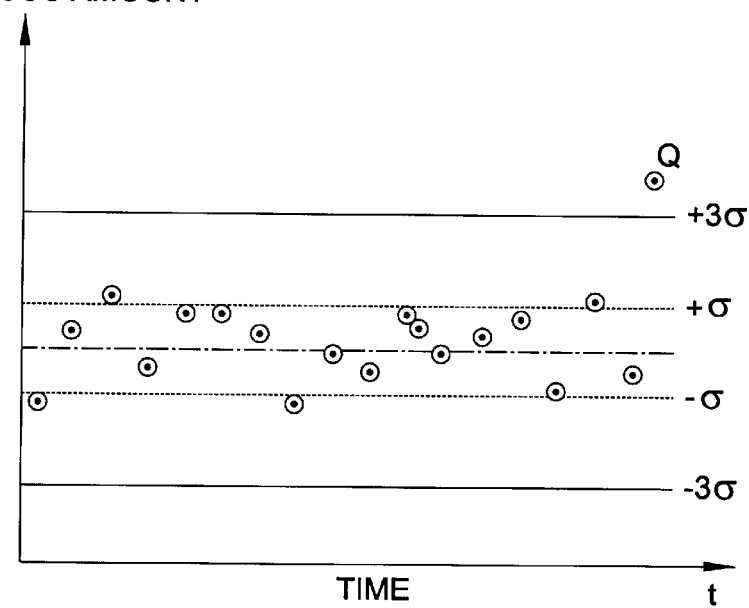
FIG. 6b illustrates the defocus amount in the first variation of the first embodiment where the fluctuation in the defocus amount is large.

On the other hand, as shown in FIG. 6b, when the fluctuations in the defocus amount are large, the variance value $\sigma^2$ becomes large, and consequently the threshold value $3\sigma$ for restarting driving becomes large. Accordingly, fluctuations in the defocus amount do not exceed the threshold value $3\sigma$ an excessively large number of times, and it is possible to strongly prevent hunting. Because the threshold value for restarting driving is thus appropriately set on the basis of the variance value of the defocus amount, the occurrence of hunting can be prevented accurately and sufficiently, while drops in the responsiveness of focus adjustment is kept to a minimum.

When the variance value of the defocus amount is computed using the average value of the focus information as the central value, the computation processing volume is markedly less than in computation processes (moving average or regressive analysis or the like) that find the trend in the defocus amount. Accordingly, it is possible to compute the variance value $\sigma^2$ in the defocus amount simply and quickly.

A second variation of this embodiment is shown in FIG. 7. The characteristic difference between the two variations lies in the operation of their respective statistical computation units 26, 32. Elements that are the same as in the first variation are shown in FIG. 7 labeled with the same reference numbers, and explanation of such is omitted here. Operation of the statistical computation unit 32 of this embodiment will become clear in the following discussion.

FIG. 8 is a flowchart for the process of the operation of the second variation of the first embodiment, in which the variance value is computed using a trend center of the focus information as the central value. First, when the release switch (not shown) of the camera 11 is depressed halfway (S1 in FIG. 8), an accumulation of photoelectric charge begins in the focus detection unit 15 (S2 in FIG. 8).

The focus computation unit 23 receives the photoelectric output from the focus detection unit 15, and computes the defocus amount through a commonly known phase difference detection computation (S3 in FIG. 8). This defocus amount bf is successively stored in the memory 25 along with the lens position Y found from the encoder 18 and the detection time t.

The target position updating unit 24 computes the target driving position that the optical system 12 is to reach on the basis of the defocus amount bf and the lens position Y (S4 in FIG. 8). Here, the statistical computation unit 32 finds the trend center of the defocus amount bf by following the procedure below.

First, the statistical computation unit 32 successively receives from the memory 25 the N previous detection times t, defocus amounts bf, and lens positions Y (same units as the defocus amount bf), and the average image plane position $Z_{avg}$ and the average detection time $t_{avg}$ are computed using:

$$Z_{avg} = \frac{1}{N} \sum_{i}^{N} (bf_i + Y_i) \quad (3)$$

and $$t_{avg} = \frac{1}{N} \sum_{i}^{N} t_i \quad (4)$$

The summation computations are performed using these average values, and the sums $S_{zt}$ and $S_{tt}$ are computed as:

$$S_{zt} = \sum_{i}^{N} (bf_i + Y_i - Z_{avg})(t_i - t_{avg}) \quad (5)$$

and $$S_{tt} = \sum_{i}^{N} (t_i - t_{avg})^2 \quad (6)$$

Using the values of these sums $S_{zt}$ and $S_{tt}$, $$a = S_{zt}/S_{tt} \quad (7)$$

and $$b = Z_{avg} - a \cdot t_{avg} \quad (8)$$

are computed, and the slope a and intercept b of the first-order regression equation are found.

Through the above statistical computation (regressive analysis), the trend center X(t) of the defocus amount bf is found (S5 in FIG. 8) as:

$$X(t) = a \cdot t + b - Y \quad (9)$$

The difference from each defocus amount bf is found using this trend center X(t) as the central value, and by finding the mean of the squares for this difference, the variance value $\sigma^2$ of the defocus amount is computed (S6 in FIG. 8) using the equation:

$$\sigma^2 = \frac{1}{N} \sum_{i}^{N} (bf_i + Y_i - a \cdot t_i - b)^2 \quad (10)$$

When updating of the target driving amount has been accomplished the previous time, i.e., has not been halted (S7 in FIG. 8), the target position updating unit 24 determines whether or not the value of the defocus amount is no greater than a predetermined focusing width (S8 in FIG. 8) and whether or not the lens speed is no greater than a predetermined value (S9 in FIG. 8).

If these determination results are affirmative, the target position updating unit 24 determines that the in-focus state has been reached and halts updating of the target driving position (S10 in FIG. 8). In this case, the motor operation amount computation unit 28 drives the motor 20 on the basis of the positional difference between the target driving position at which updating was halted and the current lens position, and the optical system 12 is driven to the target driving position and halted (S11 in FIG. 8).

If, however, the determination results are negative, the determination is that of an unfocused state, and the target driving position is updated to the newest value (S13 in FIG. 8). In this case, the motor operation amount computation unit 28 drives the motor 20 on the basis of the positional difference between the newest target driving position and the current lens position, and the optical system 12 is driven toward the newest target driving position (S11 in FIG. 8).

On the other hand, if updating of the target driving position has not been accomplished the previous time, i.e., has been halted (S7 in FIG. 8), a determination is made through the below-described sequence as to whether the change in the newest value of the defocus amount is caused by fluctuations or is caused by a significant change.

First, the target position updating unit 24 determines the threshold value for restarting driving as $3\sigma$ (three times the standard deviation $\sigma$ on the basis of the variance value $\sigma^2$ in the defocus amount. Next, the target position updating unit 24 determines whether or not the value of the newest defocus amount falls within $3\sigma$ (S12 in FIG. 8).

When the fluctuations in the defocus amount are a normal distribution, the probability of the defocus amount fluctuating in excess of this $3\sigma$ approximately 0.27%. Accordingly, when the defocus amount changes in excess of $3\sigma$ in spite of the fact that the probability is so low, it is apparent that this is not merely a change caused by fluctuations but that a significant change has occurred at the object caused by movement of the object or the like, for example.

The target position updating unit 24 restarts updating of the target driving position on the basis of these determination results (S13 in FIG. 8). As a result, driving is restarted, and the optical system 12 is driven toward the new focus point.

Conversely, when the value of the newest defocus amount is within $3\sigma$, the target position updating unit 24 decides that the change is one caused by fluctuations in the defocus amount, and the previous target driving position is maintained without change (S10 in FIG. 8) As a result, driving of the optical system 12 is not restarted, and hunting caused by fluctuations in the defocus amount is prevented. Then, the process returns to step S1 and a next iteration of these operations is performed.

Through the operations described above, the second variation can achieve the same or similar results as the first variation. In addition, the second variation of the first embodiment has a further advantage in that the effects of movement of the fluctuation center can be completely eliminated, because the variance value $\sigma^2$ in the defocus amount is computed with the trend center of the defocus amount as the central value.

Further, because the variance value $\sigma^2$ is computed with the trend center X(t) as the central value, even when the sampling interval of the defocus amount is set to be long, the correlation between the variance value $\sigma^2$ and the fluctuation state of the defocus amount can be well maintained, and the fluctuation state of the defocus amount can be judged more accurately. As a result, it is possible to more accurately set the threshold value $3\sigma$ for restarting driving.

Figure 9A:
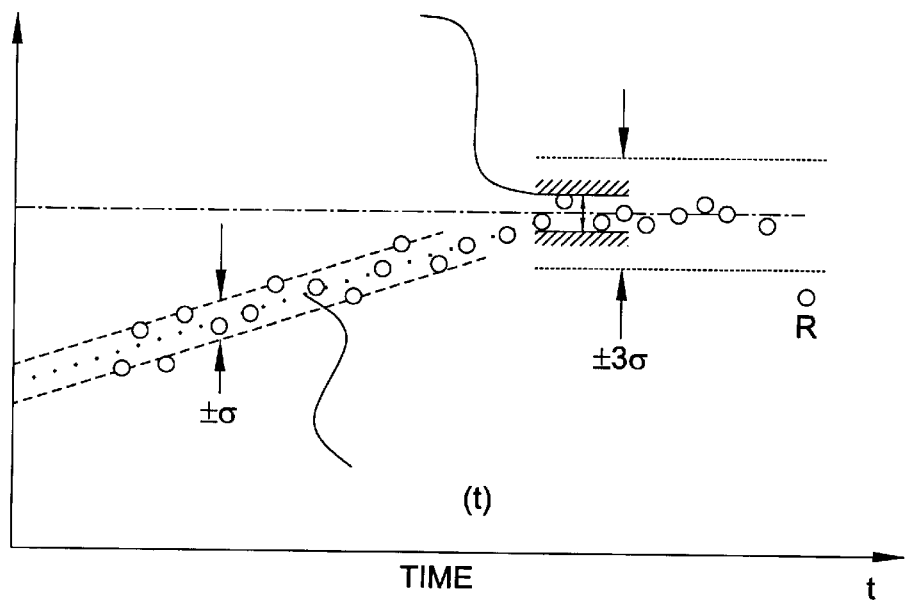
FIG. 9a illustrates the defocus amount in the second variation of the first embodiment where fluctuation in the defocus amount is small.

As shown in FIG. 9a, when the fluctuations in the defocus amount are small, the variance value $\sigma^2$ centered about the trend center X(t) becomes small, and consequently the threshold value $3\sigma$ for restarting driving becomes small. Accordingly, this embodiment is also sensitive in detecting a significant change in the defocus amount (point R in FIG. 9), so that updating the target driving position and driving the optical system 12 to focus may be promptly restarted.

Figure 9B:
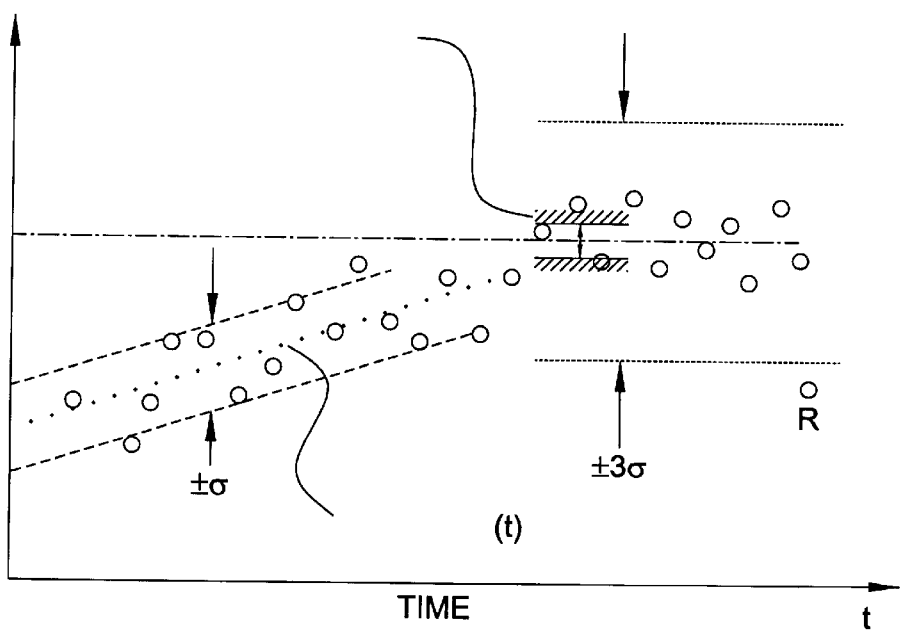
FIG. 9b illustrates the defocus amount in the second variation of the first embodiment where the fluctuation in the defocus amount is large.

On the other hand, as shown in FIG. 9b, when the fluctuations in the defocus amount are large, the variance value $\sigma^2$ centered about the trend center X(t) becomes large, and consequently the threshold value $3\sigma$ for restarting driving becomes large. Accordingly, fluctuations in the defocus amount do not exceed the threshold value $3\sigma$ an excessively large number of times, and it is possible to strongly prevent hunting. In addition, it is possible to compute the variance value $\sigma^2$ in advance, prior to entering the focusing width, and consequently it is possible to find the threshold value 3σ immediately after entering the focusing width, and to quickly start determination of the threshold value for restarting driving.

FIG. 10 illustrates a second embodiment in which a confidence handling unit 42, provided as an internal function in the microprocessor 16, receives confidence information, such as the contrast amount, at the time of focus detection from the focus computation unit 23, and revises the threshold value for restarting driving. Elements that are the same as in the first embodiment are shown in FIG. 10 labeled with the same reference numbers, and explanation of such is omitted here.

Referring to FIG. 11, when the release switch (not shown) of the camera 11 is depressed halfway (S1 in FIG. 11), an accumulation of photoelectric charge begins in the focus detection unit 15 (S2 in FIG. 11). The focus computation unit 23 receives the photoelectric output from the focus detection unit 15, and computes the defocus amount through a commonly known correlation computation.

On the other hand, in the confidence handling unit 42, the contrast amount of the object image is computed (S3 in FIG. 11) on the basis of the steepness or slope of the correlation curve (FIG. 3) found from the correlation computation. The target position updatLng unit 24 computes the target driving position that the optical system 12 should reach on the basis of the defocus amount and the lens position found from the encoder 18 (S4 in FIG. 11). If updating of the target driving position has been accomplished the previous iteration, i.e., target driving position update has not been halted (S5 in FIG. 11), the same operations as in the first embodiment are accomplished (S6–S7 in FIG. 11).

On the other hand, if updating of the target driving position has not been accomplished the previous iteration, i.e., target driving position has been halted (S5 in FIG. 11), a determination is made as to whether or not a predetermined number or greater of focus information inputs have occurred since drive halting (S10 in FIG. 11). When a predetermined number of focus information inputs have not occurred, the confidence handling unit 42 finds the threshold value in accordance with the contrast amount, and outputs this to the target position updating unit 24.

On the other hand, when the predetermined number of inputs have occurred, the statistical computation unit 26 computes the variance value $\sigma^2$ of the defocus amount using the average value of the defocus amount as the central value (S12 in FIG. 11). The threshold value is then determined. In this embodiment, the threshold value is obtained from a table on the basis of the variance value $\sigma^2$ and the contrast amount (S13 in FIG. 11).

When the value of the newest defocus amount has exceeded the threshold value (S14 in FIG. 11), the target position updating unit 24 determines that a significant change has occurred in the object, such as movement of the object, for example, and updating of the target driving position is restarted (S15 in FIG. 11). As a result, driving of the optical system 12 is restarted, and the system is driven toward the new focus point.

Conversely, when the value of the newest defocus amount is within the threshold value, the target position updating unit 24 maintains the previous target driving position without change in order to prevent hunting (S8 in FIG. 11). Then, the process returns to step S1 and performs a next iteration of these operations.

Through the above-described operations, the same advantages as in the first embodiment can be obtained with the second embodiment. Furthermore, in the second embodiment the threshold value for restarting driving is selected or revised in accordance with the contrast amount. This contrast amount is a value that changes in agreement with the object condition, and consequently it is possible to modify the threshold value promptly in response to rapid changes in the object condition without waiting for a change in the variance value, which changes gradually over a number of focus information inputs.

As described above, a focus adjustment apparatus according to the invention can set the threshold value for restarting driving of an optical system to a statistically appropriate value in accordance with the flexibility of the focus information fluctuation state, and consequently it is possible to realize a focus adjustment apparatus that appropriately combines both good suppression of hunting and good focus adjustment performance. Even during times of low brightness or low contrast, a focus adjustment apparatus according to the invention can keep the actions of an optical system remarkably stable, and provides an extremely stable "feel" during operation.

While this invention has been described in conjunction with specific embodiments outlined above, it is evident that many alternatives, modifications and variations will be apparent to those skilled in the art. For example, in the above-described embodiments the threshold value for restarting driving is set to 3σ (three times the standard deviation), but this is intended to be illustrative and not limiting, as it would be acceptable to set a threshold value suitably in accordance with the variance value of the focus information. In addition, in the above-described embodiments, the threshold value for restarting driving is normally 3σ, but when the variance value $\sigma^2$ is markedly small, there could be cases where 3σ is an ineffective value when viewed from the standpoint of the optical performance of the optical system. Hence, it would be acceptable to determine a preset lower limit value for the threshold value for restarting driving.

Furthermore, in the above-described embodiments, the variance value $\sigma^2$ of the focus information is obtained, but this is intended to be illustrative and not limiting, for it would also be acceptable to find a numerical value capable of replacing the variance value of the focus information. For example, it would be acceptable to find the standard deviation σ, the fluctuation coefficient, the frequency distribution, or the like of the focus information at a plurality of times as the sample.

In addition, in the above-described embodiments, the defocus amount is used as the focus information, but this is intended to be illustrative and not limiting, for any computed value or detected value indicating the focus state can be used as the focus information. For example, it would be acceptable to use as the focus information the range value to the object, the position of the object image plane, the focal length of the optical system, the external light passive method image spacing, the target driving position of the optical system, the external light active method light-receiving angle or light-receiving position, or the like.

In addition, in the above-described embodiments, the function X(t), which has the time t as its input variable, is used as the predicting function of regressive analysis, but this is intended to be illustrative and not limiting. In general, it is possible to use a predicting function with a variable having a correlation to the focus information as the input variable. In addition, the input variable may be of two or more types, and in this case, it is possible to use the method of multiple regressive analysis.

Furthermore, in the above-described embodiments, a first order function is used as the predicting function of regressive analysis, but this is intended to be illustrative and not limiting. In general, it is acceptable to assume a predetermined function and to designate a parameter obtaining the least square error, and consequently, it is possible to use a second order function, an exponential function or other various functions as the predicting function.

In addition, in the above-described embodiments, the trend center of the focus information is found using regressive analysis, but this is intended to be illustrative and not limiting. In general, the trend of the focus information may be found using the focus information of a plurality of times as the sample data. For example, it would be acceptable to use a moving average or auto regressive statistical computation.

Accordingly, the preferred embodiments of the invention as set forth herein are intended to be illustrative, not limiting. Various changes may be made without departing from the scope of the invention as defined in the following claims.

I claim:

1. A focus adjustment apparatus, comprising:

a focus detector that detects focus information:

a statistical computation unit coupled to the focus detector, that determines a statistical value from the focus information: and a focus controller coupled to the focus detector and the statistical computation unit, that drives an optical system based on the focus information and the statistical value, wherein the focus information includes a defocus amount, and wherein the focus controller:

determines a threshold value based on the statistical value;

determines a target driving position based on the defocus amount; and drives the optical system to an in-focus state based on the target driving position when the defocus amount exceeds the threshold value.

2. The focus adjustment apparatus of claim 1, wherein the focus information includes a plurality of focus information samples that are sampled at a plurality of sample times, each one of the sample times being different from other ones of the sample times, the sample times occurring when the focus controller is at least one of (1) not driving the optical system and (2) not generating the target driving position.

3. The focus adjustment apparatus of claim 2, wherein:

the statistical value is a variance value of the focus information; and the statistical computation unit uses an average value of the plurality of sample times as a central value in determining the variance value.

4. The focus adjustment apparatus of claim 2, wherein:

the statistical value is a variance value of the focus information; and the statistical computation unit uses a trend center of the plurality of sample times as a central value in determining the variance value.

5. The focus adjustment apparatus of claim 1, further comprising a confidence handler that at least one of determines and modifies the threshold value based on confidence information relating to reliability of the focus information.

6. The focus adjustment apparatus of claim 5, wherein said confidence information includes at least one of:

brightness of an object image;

spatial frequency distribution of the object image;

contrast of the object image;

movement speed of an object corresponding to the object image; and slope of a correlation curve when correlation computations are performed on a group of optical images created by partitioning and imaging object image light rays.

7. The focus adjustment apparatus of claim 5, wherein the focus information includes a plurality of focus information samples that are sampled at a plurality of sample times, each one of the sample times being different from other ones of the sample times, the sample times occurring when the focus controller is at least one of (1) not driving the optical system and (2) not generating the target driving position.

8. The focus adjustment apparatus of claim 7, wherein:

the statistical value is a variance value of the focus information; and the statistical computation unit uses a trend center of the plurality of sample times as a central value in determining the variance value.

9. A focus adjustment method, comprising:

detecting focus information:

determining a statistical value from the focus information;

driving an optical system based on the focus information and the statistical value, determining (1) a threshold value based on the statistical value and (2) a target driving position based on a defocus amount; and driving the optical system to an in-focus state based on the target driving position when the defocus amount exceeds the threshold value, wherein the focus information includes a defocus amount.

10. The focus adjustment method of claim 9, wherein the focus information includes a plurality of focus information samples that are sampled at a plurality of sample times, each one of the sample times being different from other ones of the sample times, the sample times occurring when the focus controller is at least one of (1) not driving the optical system and (2) not generating the target driving position.

11. The focus adjustment method of claim 10, wherein:

the statistical value is a variance value of the focus information; and an average value of the plurality of sample times is used as a central value in determining the variance value.

12. The focus adjustment method of claim 10, wherein:

the statistical value is a variance value of the focus information; and a trend center of the plurality of sample times is used as a central value in determining the variance value.

13. The focus adjustment method of claim 9, further comprising at least one of determining and modifying the threshold value based on confidence information relating to reliability of the focus information.

14. The focus adjustment method of claim 13, wherein said confidence information includes at least one of:

brightness of an object image;

spatial frequency distribution of the object image;

contrast of the object image;

movement speed of an object corresponding to the object image; and slope of a correlation curve when correlation computations are performed on a group of optical images created by partitioning and imaging object image light rays.

15. The focus adjustment method of claim 13, wherein the focus information includes a plurality of focus information samples that are sampled at a plurality of sample times, each one of the sample times being different from other ones of the sample times, the sample times occurring when the focus controller is at least one of (1) not driving the optical system and (2) not generating the target driving position.

16. The focus adjustment method of claim 15, wherein:
the statistical value is a variance value of the focus information; and
a trend center of the plurality of sample times is used as a central value in determining the variance value.

* * * * *